(No Model.)

J. M. NOLAN.
RAKE.

No. 285,653.  Patented Sept. 25, 1883.

Witnesses:
Jas. E. Hutchinson.
Henry C. Hazard.

Inventor.
John M. Nolan
by Pringle and Russell
Attorneys.

UNITED STATES PATENT OFFICE.

JOHN M. NOLAN, OF WATERBURY, CONNECTICUT, ASSIGNOR TO WILLIAM SHANNON, OF SAME PLACE.

RAKE.

SPECIFICATION forming part of Letters Patent No. 285,653, dated September 25, 1883.

Application filed June 11, 1883. (No model.)

*To all whom it may concern:*

Be it known that I, JOHN M. NOLAN, of Waterbury, in the county of New Haven, and in the State of Connecticut, have invented certain new and useful Improvements in Rakes; and I do hereby declare that the following is a full, clear, and exact description thereof, reference being had to the accompanying drawings, making a part of this application, in which—

Figure 1:
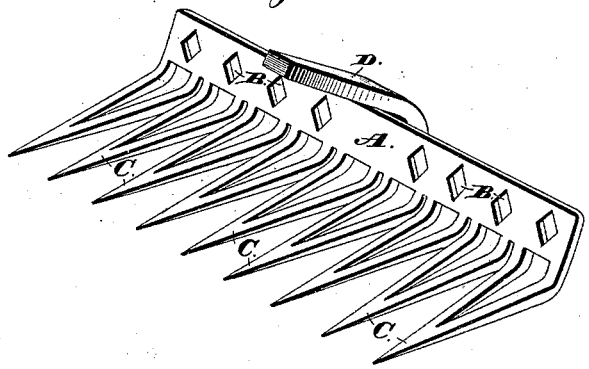
Figure 2:
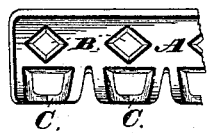

Figure 1 shows a perspective view of my improved rake-head, and Fig. 2 a rear view of a portion of the rake.

Letters of like name and kind refer to like parts in each of the figures.

The object of my invention is to provide an improvement in lawn-rakes; and to this end it consists in the rake-head constructed as hereinafter described, and specifically pointed out in the claims.

In the drawings, A designates the back or body of the rake-head, which is formed with a series of diamond-shaped openings, B B, which are made flaring in shape, so as to be larger at the rear of the head than in front, as shown in Fig. 2. Projecting forward from the lower edge of and cast in one piece with the head are the open V-shaped teeth C C. The contiguous limbs of the teeth are close together at their rear ends, or where they join the rake-head. The teeth are set at an obtuse angle to the plane of the head, and the tang D, by which the rake-head is attached to its handle, also stands at such an angle to the head that the teeth will, when the rake is in use, slide along the surface of the ground and not dig into and turn the same with their points. The roots of the grass are therefore not disturbed or injured and the turf is not torn where my rake is used. Leaves, sticks, and coarse rubbish will be collected by the teeth and carried along upon the upper surface thereof, while fine gravel and dirt will be sifted through the openings therein and in the head. The latter openings, B B, are made of the shape shown in the drawings and described above, so that they may not become clogged. With this construction, whatever is small enough to enter the front end of one of the openings will evidently pass freely through the rake-head and fall out at the rear. The outer edges of the teeth, as well as the inner edges of the openings in them, are beveled from the upper surface of the teeth down, so that both the openings in and those between the teeth are made larger below than above, with the same end in view as in the case of the openings B B in the rake-head itself, as set forth above.

Teeth beveled like mine have been found to be advantageous as sliding over the ground more easily than those with perpendicular sides and sharp edges. As each tooth is spread out, as shown, and attached at two points to the rake-head, it will be strong and durable.

The whole rake-head, including the tang, is made of malleable iron cast in one piece in the shape and with the openings as shown and described. It can be made quite cheaply, and from its form and peculiar construction, as set forth above, is especially adapted for use on fine lawns, as it will thoroughly collect and remove all leaves, stones, sticks, and rubbish without injury to the turf or scraping up and removal of any of the loam, dirt, or fine gravel.

Having thus fully set forth the nature and merits of my invention, what I claim is—

1. As an article of manufacture, the rake-head formed in one piece, and consisting of a back provided with a series of openings and with open V-shaped teeth, substantially as and for the purpose set forth.

2. As an article of manufacture, the rake-head and tang, made in one piece, said rake-head consisting of a back provided with a series of openings, and open V-shaped teeth, substantially as shown as described.

3. In a rake-head, the back provided with a series of openings, each one of which is made flaring from its front to its rear end, substantially as and for the purpose set forth.

4. The rake-head having the back provided with a series of openings, each one of which is made flaring from its front to its rear end, and the open V-shaped teeth with the outer and inner edges of their limbs beveled, as shown, so that the spaces between the teeth and the openings through them are larger below than above, substantially as and for the purpose described.

In testimony that I claim the foregoing I have hereunto set my hand this 8th day of May, A. D. 1883.

JOHN M. NOLAN.

Witnesses:
JOHN W. McDONALD,
CHAS. G. ROOT.